United States Patent [19]

Raven et al.

[11] Patent Number: 4,607,284
[45] Date of Patent: Aug. 19, 1986

[54] MOVEMENT-ADAPTIVE TRANSVERSAL-RECURSIVE NOISE SUPPRESSION CIRCUIT FOR A TELEVISION SIGNAL

[75] Inventors: Johannes G. Raven; Marcellinus J. J. C. Annegarn, both of Eindhoven, Netherlands

[73] Assignee: U.S. Philips Corporation, New York, N.Y.

[21] Appl. No.: 608,673

[22] Filed: May 9, 1984

[30] Foreign Application Priority Data

May 11, 1983 [NL] Netherlands ............ 8301680

[51] Int. Cl.⁴ ............................................. H04N 5/213
[52] U.S. Cl. ..................................... 358/167; 358/166; 358/36
[58] Field of Search ................ 358/167, 166, 37, 36

[56] References Cited

U.S. PATENT DOCUMENTS 3,009,016 11/1961 Graham ............................... 358/167
4,107,736 8/1978 Lowry et al. ...................... 358/167 X
4,393,396 7/1983 Raven et al. ...................... 358/167 X

FOREIGN PATENT DOCUMENTS 2098023 11/1982 Netherlands ............ 358/167

Primary Examiner—James J. Groody
Assistant Examiner—E. Anne Toth
Attorney, Agent, or Firm—Thomas A. Briody; William J. Streeter; Edward W. Goodman

[57] ABSTRACT

A movement-adaptive transversal-recursive noise suppression circuit for a television signal can be provided in a simple way with only a single control system (19) for changing from transversal to recursive filtering while maintaining optimum noise suppression. The circuit includes a first combining circuit having a first input for receiving the television signal, a delay circuit coupled to an output of the first combining circuit and a second combining circuit having a first input coupled to an output of the delay circuit and a second input coupled to the output of the first combining circuit, the output of the delay circuit being also coupled to a second input of the first combining circuit, and an output of the second combining circuit being the output of the noise suppression circuit.

6 Claims, 2 Drawing Figures

MOVEMENT-ADAPTIVE TRANSVERSAL-RECURSIVE NOISE SUPPRESSION CIRCUIT FOR A TELEVISION SIGNAL

BACKGROUND OF THE INVENTION

The invention relates to a movement-adaptive transversal-recursive noise suppression circuit for a television signal, comprising a first combining circuit having a first input coupled to an input of the noise suppression circuit and a second input coupled to an output of a delay circuit, an input of which is coupled to an output of the first combining circuit, the output of the delay circuit further being coupled to a first input of a second combining circuit, a second input of which is coupled to the input of the noise suppression circuit.

Revue de Radio-Diffusion-Television No. 62, April/May 1978, pages 35–42 discloses a noise suppression circuit of the above-described type, the first input of the second combining circuit being coupled via a movement information-dependent transfer circuit to the output of the delay circuit which has a delay of a picture period and the second input of the first combining circuit being coupled to the input of the noise suppression circuit via a complementary movement information-dependent transfer circuit, while the first combining circuit is movement information-dependent so that the noise suppression circuit changes from recursive to transversal accordingly as more movement occurs in a picture to be displayed. A given ratio of movement information-dependent transfer factors of the signal paths via the first and the second combining circuits is mentioned as the most advantageous ratio.

As Applicants have found, such a noise suppression circuit has the advantage, when used in color difference signal paths of color television receivers, that in both the transversal and the recursive state of the noise suppression circuit, a suppression of the cross-talk effect from the luminance signal to the chrominance signal in the color difference signals also occurs.

SUMMARY OF THE INVENTION

The invention has for its object to provide a simplified and improved noise suppression circuit.

According to the invention, a movement-adaptive transversal-recursive noise suppression circuit of the type set forth in the opening paragraph, is characterized in that the second input of the second combining circuit is coupled to the input of the noise suppression circuit via the first combining circuit and that the signal path from the output of the first combining circuit via the second input of the second combining circuit to the output thereof has a movement information-independent transfer factor.

It has been found that just because of this fact, the above-mentioned most advantageous ratio of transfer factors in the different signals paths occur, although only the first combining circuit needs to be movement information-dependent, which results in a significant simplification of the circuit.

If, in addition, a further delay circuit and a movement information-dependent transfer is used in given signal paths via the second combining circuit, an improved chrominance cross-talk suppression for color difference signals can be obtained.

DESCRIPTION OF THE DRAWING

The invention will now be described in greater detail by way of example with reference to the accompanying drawing.

In the drawing.

DESCRIPTION OF THE PREFERRED EMBODIMENT

Figure 1:
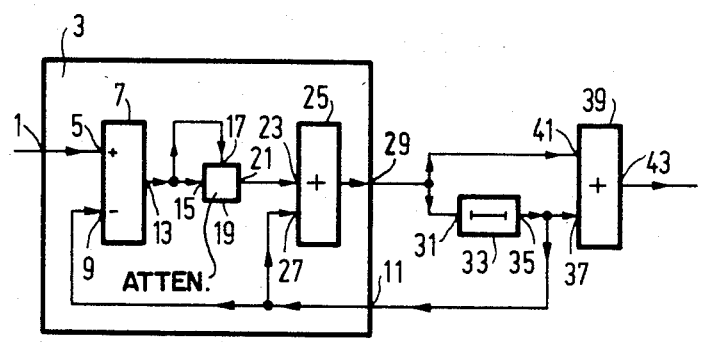
FIG. 1 illustrates, by means of a block diagram, a movement-adaptive transversal-recursive noise suppression circuit according to the invention.

In FIG. 1 a television signal, for example, a luminance signal or a color difference signal, is applied to a first input 1 of a first combining circuit 3.

The first input 1 of the first combining circuit 3 is connected to an input 5 of a subtracting circuit 7, a further input 9 of which is connected to a second input 11 of the first combining circuit 3 and an output 13 to an input 15 and to a control signal input 17 of an attenuator 19 having a variable transfer factor. An output 21 of the attenuator 19 is connected to an input 23 of an adding circuit 25, a further input 27 of which is connected to the second input 11 of the first combining circuit 3, and an output of the adding circuit 25 forms the output 29 of the first combining circuit 3.

The output 29 of the first combining circuit 3 is connected to an input 31 of a delay circuit 33, an output 35 of which is connected to a first input 37 of a second combining circuit 39 and to the second input 11 of the first combining circuit 3. The output 29 of the first combining circuit 3 is further connected to a second input 41 of the second combining circuit 39, and output 43 of the second combining circuit 39 forms the output of the noise suppression circuit.

The circuit operates fully in accordance with the circuit shown in FIG. 1 of the publication in Revue de Radio-Diffusion-Television No. 52, April/May 1978, pages 35–42 when therein a=½b is chosen as the most advantageous value and b is the transfer factor of the attenuator 19. The voltage at the output 43 becomes twice as high as the voltage at the output of the prior art circuit. The control signal at the control signal input 17 of the attenuator 19, which serves as a movement information signal, is here, for the sake of simplicity, shown as originating from the output 13 of the subtracting circuit 7, which serves as a movement detector. It will be obvious that this movement information signal may alternatively be generated in a different way, for example in the way described in the publication. In the control signal path, the attenuator 19 may further alternatively comprise, for example, a threshold circuit or may be a non-linear circuit which does not require a control signal.

The delay circuit 33 can have a time delay of one picture period if the circuit is used to suppress noise in a color difference signal obtained by demodulation of a N.T.S.C.-chrominance signal. The control signal for the attenuator 19 can then be obtained as shown in FIG. 1. Chrominance cross-talk reduction is then also obtained which, in the case of movement when the circuit switches from recursive to transversal, is maintained.

If the circuit is used to suppress noise in a luminance signal or in a color difference signal obtained by demodulation of a PAL chrominance signal, then the time delay may be one field period minus half a line period. A delay circuit which has no time delay in one field and a time delay of one line period in the other field is then preferably included in the connection from the output 35 of the delay circuit 33 to the second input 11 of the first combining circuit 3.

In the latter case, when noise suppression is used in a PAL color difference signal, a movement detector which acts on the relevant PAL-color difference signal is preferably used for the control of the attenuator 19.

Figure 2:
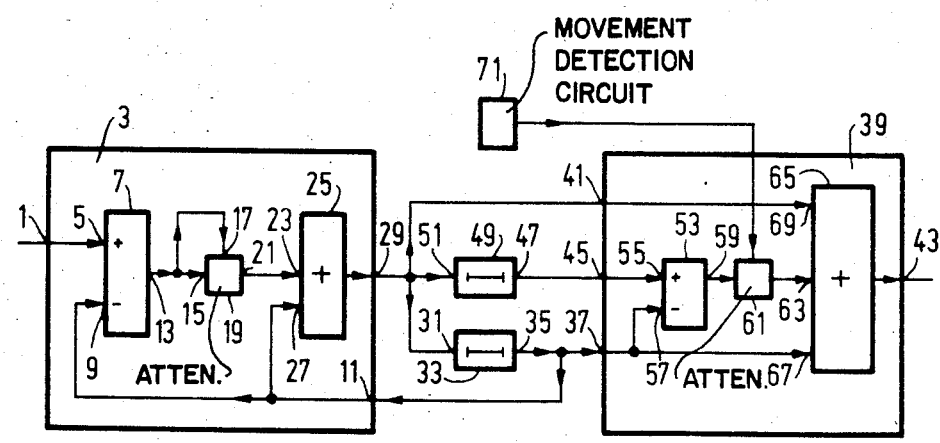
FIG. 2 illustrates, also by means of a block diagram, a movement-adaptive transversal-recursive noise suppression circuit for an N.T.S.C.-color difference signal, according to the invention.

In FIG. 2 components corresponding to these in FIG. 1 are given the same reference numerals as in FIG. 1. These components will not be described again here.

The difference with the embodiment shown in FIG. 1 is that the second combining circuit 39 has a third input 45 which is connected to an output 47 of a further delay circuit 49, an input 51 of which is connected to the output 29 of the first combining circuit 3.

In addition, the second combining circuit 39 comprises a subtracting circuit 53, an input 55 of which is connected to the third input 45 and an input 57 of which is connected to the first input 37 of the second combining circuit 29. An output 59 of the subtracting circuit 53 is connected, via a controllable attenuator 61, to an input 63 of an adder circuit 65, an input 67 of which is connected to the first input 37 and an input 69 of which is connected to the second input 41 of the second combining circuit 39. The output 43 of the second combining circuit 39 is at the same time the output of the adding circuit 65.

The further delay circuit 49 has a time delay of one line period, the delay circuit 33 has a time delay of one picture period.

The signal at the input 1 of the circuit is a demodulated N.T.S.C.-color difference signal, the controllable attenuator 61 is controlled by an output signal from a movement detection circuit 71 which acts on the low-frequency portion of the luminance signal so that, when there is movement in the luminance signal, the transversal portion of the circuit operates with a time delay of one line period which then results in a chrominance crosstalk suppression without after-effects.

Instead of the subtracting circuit 53 and a single attenuator in the signal path to the input 63 of the adder circuit 65, two complementarily controlled attenuator circuits can optionally be used in the signal paths from the inputs 37 and 45 of the second combining circuit 39 to the inputs 67 and 63 of the adder circuit 65.

What is claimed is:

1. A movement-adaptive transversal-recursive noise suppression circuit for a television signal, comprising:

a first combining circuit having a first input, constituting an input of the noise suppression circuit, a second input, and an output, a delay circuit having an input coupled to the output of said first combining circuit, and an output coupled to the second input of said first combining circuit; and a second combining circuit having a first input also coupled to the output of said delay circuit, and a second input coupled to the output of said first combining circuit, an output of said second combining circuit constituting an output of said noise suppression circuit; whereby a signal path from the output of said first combining circuit to the output of said second combining circuit via the second input thereof has a movement information-independent transfer factor.

2. A movement-adaptive transversal-recursive noise suppression circuit as claimed in claim 1, characterized in that the signal path from the output of the first combining circuit, via the first input of the second combining circuit, to the output of the second combining circuit has a movement information-independent transfer factor.

3. A movement-adaptive transversal-recursive noise suppression circuit as claimed in claim 1, characterized in that the second combining circuit has a third input which is coupled to the output of the first combining circuit via a further delay circuit.

4. A movement-adaptive-transversal-recursive noise suppression circuit as claimed in claim 3, characterized in that the second combining circuit comprises a subtracting circuit, the inputs of which are coupled to the first and third inputs of the second combining circuit and the output of which is coupled, via a movement information-dependent transfer circuit, to an input of an adder circuit of which two further inputs are coupled to the first and the second inputs, respectively of the second combining circuit.

5. A movement-adaptive transversal-recursive noise suppression circuit as claimed in claim 2, characterized in that the second combining circuit has a third input which is coupled to the output of the first combining circuit via a further delay circuit.

6. A movement-adaptive-transversal-recursive noise suppression circuit as claimed in claim 3, characterized in that the second combining circuit comprises a subtracting circuit the inputs of which are coupled to the first and third inputs of the second combining circuit and the output of which is coupled via a movement information-dependent transfer circuit to an input of an adder circuit of which two further inputs are coupled to the first and the second inputs, respectively of the second combining circuit.

* * * * *